United States Patent
Herbolsheimer

(10) Patent No.: US 10,457,826 B2
(45) Date of Patent: Oct. 29, 2019

(54) LEAD REFILL FOR WRITING, DRAWING AND/OR PAINTING DEVICES AND METHOD FOR THE PRODUCTION THEREOF

(71) Applicant: STAEDTLER Mars GmbH & Co. KG, Nürnberg (DE)

(72) Inventor: Johannes Herbolsheimer, Trautskirchen (DE)

(73) Assignee: STAEDTLER MARS GMBH & CO. KG, Nürnberg (DE)

( * ) Notice: Subject to any disclaimer, the term of this patent is extended or adjusted under 35 U.S.C. 154(b) by 0 days.

(21) Appl. No.: 15/039,096

(22) PCT Filed: Nov. 7, 2014

(86) PCT No.: PCT/EP2014/002990
§ 371 (c)(1),
(2) Date: May 25, 2016

(87) PCT Pub. No.: WO2015/078556
PCT Pub. Date: Jun. 4, 2015

(65) Prior Publication Data
US 2017/0015858 A1    Jan. 19, 2017

(30) Foreign Application Priority Data
Nov. 29, 2013   (DE) .................. 10 2013 020 666

(51) Int. Cl.
| | | |
|---|---|---|
| *C09D 13/00* | (2006.01) | |
| *C09D 5/06* | (2006.01) | |
| *C09D 125/06* | (2006.01) | |
| *C09D 125/12* | (2006.01) | |
| *C09D 7/63* | (2018.01) | |

(52) U.S. Cl.
CPC ............. *C09D 13/00* (2013.01); *C09D 5/06* (2013.01); *C09D 7/63* (2018.01); *C09D 125/06* (2013.01); *C09D 125/12* (2013.01)

(58) Field of Classification Search
CPC .... C09D 13/00; C09D 7/1233; C09D 125/06; C09D 125/12
USPC ........................................... 523/164
See application file for complete search history.

(56) References Cited

U.S. PATENT DOCUMENTS

| | | |
|---|---|---|
| 3,704,071 A | 11/1972 | Muller et al. |
| 5,591,787 A | 1/1997 | Schlennert et al. |
| 6,875,261 B2 | 4/2005 | Hashimoto et al. |
| 7,803,220 B2 | 9/2010 | Thies |
| 8,648,128 B2 | 2/2014 | Thies |
| 2002/0139278 A1 | 10/2002 | Hashimoto |
| 2005/0272715 A1* | 12/2005 | Kobayashi ........... C07D 401/12 514/210.2 |
| 2008/0078301 A1 | 4/2008 | Pinzer et al. |
| 2011/0118383 A1* | 5/2011 | Thies .................... B43K 19/02 523/164 |

FOREIGN PATENT DOCUMENTS

| | | |
|---|---|---|
| DE | 3421408 A1 | 1/1986 |
| DE | 4230792 A1 | 3/1994 |
| DE | 102004051618 A1 | 5/2006 |
| DE | 60118184 T2 | 12/2006 |
| EP | 0597328 A2 | 5/1994 |
| EP | 1302516 A1 | 4/2003 |
| EP | 1826253 A2 | 8/2007 |
| EP | 2055733 A1 | 5/2009 |
| JP | S60110772 A | 6/1985 |
| JP | H06287501 A | 10/1994 |
| JP | H09202869 A | 8/1997 |
| WO | 2010006742 A1 | 1/2010 |

* cited by examiner

*Primary Examiner* — Doris L Lee
(74) *Attorney, Agent, or Firm* — Lucas & Mercanti, LLP; Klaus P. Stoffel

(57) ABSTRACT

A polymer-bound lead refill for writing, drawing and/or painting devices, in particular for pencils or colored pencils, including at least one binding agent, at least one wax, at least one coloring agent and at least one filling agent. The lead refill including at least one surfactant.

3 Claims, No Drawings

LEAD REFILL FOR WRITING, DRAWING AND/OR PAINTING DEVICES AND METHOD FOR THE PRODUCTION THEREOF

The present application is a 371 of International application PCT/EP2014/002990, filed Nov. 7, 2014, which claims priority of DE 10 2013 020 666.9, filed Nov. 29, 2013, the priority of these applications is hereby claimed and these applications are incorporated herein by reference.

BACKGROUND OF THE INVENTION

The invention relates to refills for writing, drawing and/or painting devices based on polymeric binders, and to a method for its manufacture.

Polymer-bonded refills based on polymers derived from crude oil for writing, drawing and/or painting are known in principle.

The term "colored or graphite-based polymer-bonded refills for writing, drawing and/or painting" should be understood to mean on the one hand, refills which have been firmly fixed into wood or other materials which can be sharpened, and on the other hand, refills which are displaceably mounted in a rigid sheath. Examples in this regard are wooden pencils and refills for mechanical pencils, for example those known as retractable pencils or drop-action pencils. In this case, the refills usually have an external diameter in the range from approximately 0.3 mm to 6 mm. Refills of this type also include those known as woodless pencils, which are refills without a sheath.

Thus, for example, polymer-bonded colored and graphite refills are known from WO 2010/006742 A1. Refills of this type contain a polymeric binder, wax, palm oil and fillers.

The use of wax in refills of this type means on the one hand that the writing properties are affected, and on the other hand that the extrusion pressure when manufacturing the refills is reduced.

The disadvantage with refills of this type is that adding wax has a negative influence on the specific strength of the refills. It has been shown that the specific strength falls steadily with increasing wax content.

The waxes can be considered to have a negative influence on wetting of the fillers within the polymer matrix.

SUMMARY AND DESCRIPTION OF THE INVENTION

Thus, the object of the invention is to provide a refill for writing, drawing and/or painting which does not exhibit the disadvantages mentioned above and which in particular has a high specific strength in the presence of waxes.

A further object of the invention is constituted by the provision of a method for the manufacture of refills of this type.

This object is accomplished by adding surfactants to the refill compound. In this manner, a polymer-bonded refill for writing, drawing and/or painting devices, in particular for lead and/or colored pencils is provided, which comprises at least one polymeric binder, at least one wax, at least one colorant, at least one filler and at least one surfactant as a wetting agent.

The surfactant, being a wetting agent or surface-active substance, improves wetting of the fillers by the molten polymer, whereby the differences in polarity between the individual components of the mixture are reduced, whereupon a stable structure is formed and thus the specific strength increases.

It has surprisingly been shown that by adding at least one surfactant to the refill compound, the strength of the refills produced therefrom increases by up to 15%.

In addition, it has surprisingly been shown that the marks that are produced with the refill in accordance with the invention have good gliding properties as well as good erasability.

These surprising effects have been observed with both lead and colored refills.

The proportion of the at least one surfactant in the refill composition is in the range from more than zero to 6% by weight, preferably in the range 0.2% to 3% by weight.

The surfactant may be a cationic, anionic and/or non-ionic surfactant.

Examples of non-ionic surfactants are surfactants from the fatty acid ester group.

Examples of cationic surfactants are ammonium compounds.

An example of an anionic surfactant is sodium alkyl sulphonate.

Preferably, the at least one surfactant comprises at least one compound from the group formed by fatty acid esters and/or quaternary ammonium compounds.

Advantageously, the polymer-bonded refill comprises:

| | |
|---|---|
| 10% to 40% by weight | polymeric binder |
| more than zero to 6% by weight | surfactant |
| 2% to 25% by weight | wax and/or oils |
| 0 to 30% by weight | colorant |
| remainder | fillers |

Particularly preferably, the polymer-bonded refill comprises:

| | |
|---|---|
| 12% to 30% by weight | polymeric binder |
| 0.2% to 3% by weight | surfactant |
| 4% to 20% by weight | wax and/or oils |
| remainder | fillers |

The polymer-bonded refill may be either a lead refill and/or a colored pencil refill.

Advantageously, the at least one filler is selected from at least one filler from the groups comprising graphite, hexagonal boronitride, phyllosilicates, chalk, barite, colored pigments and/or achromatic pigments.

Preferably, for pencil lead refills, in particular, graphite or graphite in combination with carbon black is used as the colouring filler.

For colored pencil refills, combinations of white or achromatic fillers such as hexagonal boronitride, phyllosilicates etc., with colouring pigments such as azo pigments, phthalocyanines, dioxazines, quinacridones, iron oxides, carbon black, graphite, ultramarine, iron-cyano complexes have proved to be advantageous.

A preferred composition for a pencil lead refill comprises the following:

| | |
|---|---|
| 12% to 30% by weight | polymeric binder |
| 0.2% to 3% by weight | surfactant |
| 2% to 20% by weight | wax and/or oil |
| remainder | graphite or graphite and carbon black |

Formulation example 1 for a pencil lead refill comprises:

| | |
|---|---|
| styrene acrylonitrile (SAN) | 20% by weight |
| POE fatty ammonium ethosulphate | 1% by weight |
| calcium stearate | 8% by weight |
| palm oil | 1% by weight |
| graphite | 66% by weight |
| carbon black | 4% by weight |

Formulation example 2 for a pencil lead refill comprises:

| | |
|---|---|
| Polystyrene (PS) | 18% by weight |
| POE fatty ammonium ethosulphate | 1% by weight |
| fatty alcohol polyglycol ether | 1% by weight |
| graphite | 69% by weight |
| aluminium stearate | 11% by weight |

The graphite listed in the examples may act as the colorant for pencil lead refills. Similarly, however, combinations of graphite and carbon black may also be employed.

A composition for a colored pencil refill comprises the following:

| | |
|---|---|
| 10% to 30% by weight | binder |
| 5% to 20% by weight | wax and/or oil fraction |
| greater than zero to 6% by weight | surfactant |
| remainder | phyllosilicate(s) and/or hexagonal boronitride as well as at least one colored pigment and/or at least one achromatic pigment |

Formulation example 3 for a colored pencil refill:

| | |
|---|---|
| polystyrene (PS) | 16% by weight |
| ethylene bis-stearamide | 13% by weight |
| perylene | 2.0% by weight |
| fatty acid ester | 4% by weight |
| phthalocyanine | 8% by weight |
| phyllosilicate | 62% by weight |

Colored and/or achromatic pigments may be employed as the colouring agent in colored pencil refills. Examples of pigments of this type are azo pigments, phthalocyanines, dioxazines, quinacridones, iron oxides, carbon black, graphite, ultramarine and iron-cyano complexes.

The at least one polymeric binder is formed from at least one polymer from the group comprising polystyrene (PS), styrene/acrylonitrile (SAN), polylactide (PLA), styrene/butadiene (SB), polyolefins (PO) and acrylonitrile/butadiene/styrene (ABS).

At least one wax from the group comprising fatty acids, stearates, montan waxes, amide waxes and paraffins may be used as the at least one wax.

The table below compares the bending strengths of refills with and without a surfactant content. The refill compound used was a mass in accordance with formulation example 2 (pencil lead refill), whereas for the comparison, the surfactant or the surfactant mixture was omitted from the compound of formulation example 2.

| | Refill with surfactant | Refill without surfactant |
|---|---|---|
| Bending strength (MPa) | 52.8 | 45.3 |

It can clearly be seen from the table that a refill which comprises at least one surfactant has a measured increase in strength of approximately 15% compared with refills without surfactants.

The measurement was carried out by means of a 3-point bending test complying with DIN 52186, in which cylindrical test pieces/refills with a diameter of 3 mm and a length of 170 mm were tested. The test pieces in this case were mounted on movable rollers with a span of 50 mm. the force was applied by means of a test head. The rollers and test stamps had a radius of 2 mm.

An extrusion method has been shown to constitute an advantageous method for the manufacture of a polymer-bonded refill in accordance with the invention.

In particular, the refill in accordance with the invention is manufactured by carrying out the following steps:
  mixing and granulating all of the components for the formulation of the refill in order to form a refill granulate
  extruding the refill granulate at a temperature in the range 120° C. to 200° C. in an extruder through a suitable die in order to form continuous refill rods
  cooling and solidifying the continuous refill rod, and
  cutting the continuous refill rod to final length, in particular to the required length of the pencil lead.

Depending on the extrusion head, the cross-section of the refill may have any form—round, square or combinations thereof. Furthermore, it is possible to carry out multiple co-extrusion of various refill formulations in one extrusion head in order to bond a multi-component refill.

Furthermore, a suitable co-extrusion method may be employed in order to extrude the refill granulate with other polymer-bonded materials so as to form a complete pencil lead.

The invention claimed is:

1. A polymer-bonded colored pencil refill for writing, drawing and/or painting tools, comprising:
  at least one polymeric binder, wherein the at least one polymeric binder is formed from at least one polymer from the group consisting of: polystyrene (PS); styrene/acrylonitrile (SAN); polylactide (PLA); styrene/butadiene (SB); polyolefins (PO); and acrylonitrile/butadiene/styrene (ABS);
  at least one wax and/or oil fraction;
  at least one colorant;
  at least one filler; and
  at least one cationic surfactant which is quaternary ammonium, wherein the quantity of the at least one surfactant is 0.2 to 3% by weight, wherein the refill comprises

| | |
|---|---|
| 12% to 30% by weight | polymeric binder |
| 2% to 20% by weight | wax and/or oil |
| remainder | graphite or graphite and carbon black as the colorant and filler. |

2. The refill as claimed in claim 1, further comprising an anionic surfactant which is sodium alkyl sulphonate.

3. A method for manufacturing a polymer-bonded refill according to claim 1, comprising the steps of extruding the refill.

* * * * *